H. ZOELLY.
DEVICE FOR TRANSMITTING THE LOAD OF WHEELED VEHICLES TO THEIR WHEELS.
APPLICATION FILED MAY 19, 1919.
1,331,039.
Patented Feb. 17, 1920.
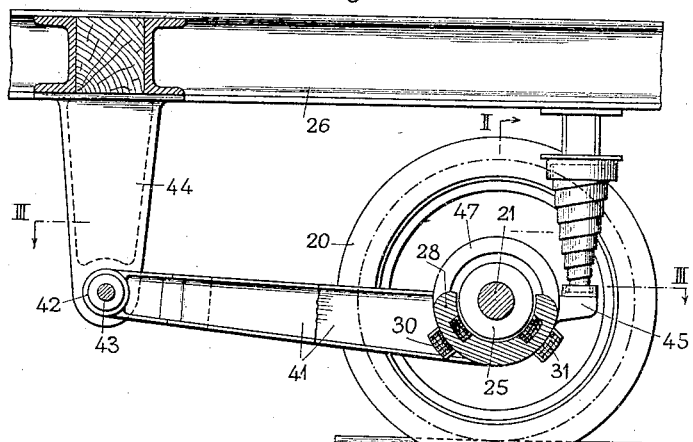
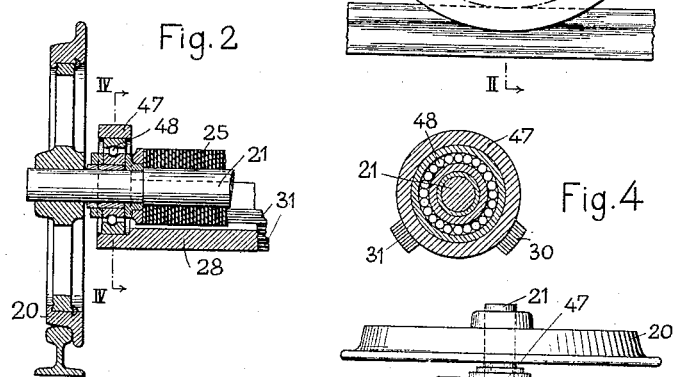
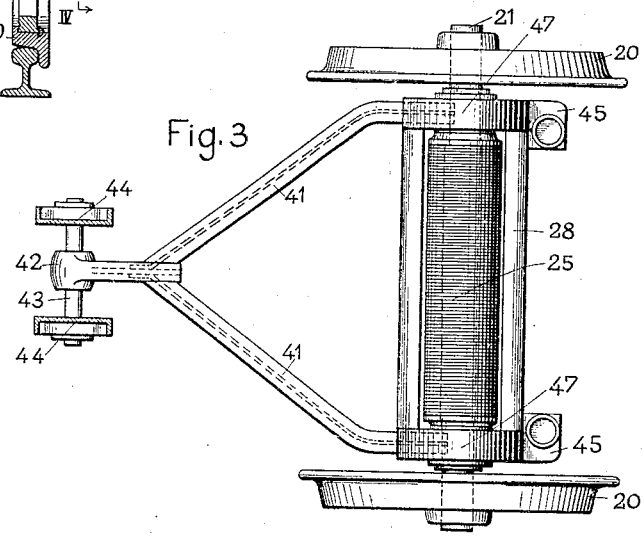
Inventor:
Henri Zoelly
By Heinzorth Jr
Atty

UNITED STATES PATENT OFFICE.

HENRI ZOELLY, OF ZURICH, SWITZERLAND.

DEVICE FOR TRANSMITTING THE LOAD OF WHEELED VEHICLES TO THEIR WHEELS.

1,331,039.   Specification of Letters Patent.   Patented Feb. 17, 1920.

Application filed May 19, 1919. Serial No. 298,115.

*To all whom it may concern:*

Be it known that I, HENRI ZOELLY, a citizen of the Republic of Switzerland, residing at Hardturmstrasse 19, Zurich, Switzerland, have invented certain new and useful Improvements in Devices for Transmitting the Load of Wheeled Vehicles to Their Wheels; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in devices for transmitting the load of wheeled vehicles to their wheels. The characteristic feature of this device consists in that it comprises ball-bearings as well as an electro-magnetically acting suspension device arranged between the wheels and the frame of the vehicle, said ball-bearings and suspension device being adapted to mutually assist and secure one another in the proper position.

In order to reduce the friction in the axle bearings and consequently the running resistance of wheeled or rolling vehicles, it has been proposed to use ball-bearings and to fit even vehicles of relatively great size with such bearings. Ball-bearings alone have not however given good results when fitted to heavy vehicles designed for transporting heavy loads and for running at a high speed for long periods as there exists in such a case a permanent danger of ball-fractures.

For the purpose of reducing the friction in the axle bearings it has further been proposed to insert between the wheels and the frame of rolling vehicles electro-magnetically acting suspension devices adapted to carry the frames of the vehicles. But the vehicles provided with such electro-magnetically acting suspension devices have to be fitted with sliding bearings for the vehicle axles. Sliding bearings have however the drawback that they have to be designed of relatively great width and that they must be lubricated, so that the provision of such sliding bearings involves many disadvantages. Moreover, the vehicles provided with magnetically acting suspension devices of the kind referred to are also fitted with complicated contrivances in order to secure under all working conditions the required distance between the rotatable portion of the magnetically acting suspension device and the stationary portion of this device. In the device according to this invention all the above mentioned disadvantages are eliminated.

Owing to the fact that in the novel device the bearings provided chiefly only for the purpose of securing the proper distance between the different parts of the magnetically acting suspension device are designed as ball-bearings, the very important advantage is attained with regard to the arrangements comprising sliding bearings lubricated with oil that any changes in the distance between the centers of the bearing body and the supporting axle are nearly excluded, as such changes amount at the utmost only to thousandth's of millimeters, while in sliding bearings the thickness of the layer of oil is yet liable to relatively great changes. As moreover in the device according to this invention the load of the vehicle is transmitted during the normal running of the latter to the running wheels by the electro-magnetically acting suspension device and the ball-bearings have to take up said load only in the unusual case of the current failing to excite the electromagnets, said ball-bearings are subjected only to a very small wear and tear. It is thus possible to secure the proper distance between the electromagnets, which distance has to be made as small as possible, in a very appropriate manner. Besides, ball-bearings require no lubrication and they can be light and of small width so that they are particularly suitable for the purpose aimed at by this invention.

One form of carrying the invention into effect is shown by way of example in the accompanying drawing. In this drawing:

Figure 1 is a vertical longitudinal section through an arrangement in which the body of iron to be magnetized is arranged directly on the axle of a railway car between two wheels of the latter.

Fig. 2 is a section on the line II—II of Fig. 1,

Fig. 3 is a horizontal section on the line III—III of Fig. 1, and

Fig. 4 is a vertical cross-section on the line IV—IV of Fig. 2 through the bearing securing the proper distance between the parts of the electro-magnetically acting suspension device.

Referring to the drawing, 21 designates an axle of the car. Onto this axle is pushed a laminated body of iron 25 arranged between the wheels 20. The dimensions of this body 25 in a radial direction are relatively small, while its length is designed as great as possible. 28 designates a magnet arranged beneath said body of iron 25 and having in a meridian section a semi-cylindrical form. The magnet 28 can be excited by means of coils 30 and 31. A fork-shaped member 41 connects the magnet 28 to an eye 42 pivotally mounted on a bolt 43. The latter rests in its turn in two supports 44 fixed to the frame 26 of the car. The opposite side of the magnet 28 is provided with two extensions 45 on which rests buffer springs 46 which support the frame 26 of the car. The ends 47 of the magnet 28 (Fig. 2) are annular. Into each of these ends is inserted a ball-bearing 48 adapted to maintain a constant distance between the car axle 21 and the magnet 28. This is effected wholly independently of the load acting upon the magnet 28 supporting the frame 26 of the vehicle and of the changes in the attractive power acting between the magnet 28 and the body of iron 25. As already stated, the ball-bearings 48 are provided chiefly only for the purpose of securing said distance between the parts 21 and 28, the load being transmitted to the wheels of the rolling vehicle by the elements 25 and 28 of the magnet.

What I claim now as my invention is:

1. A device for transmitting the load of wheeled vehicles to their wheels, comprising ball-bearings inserted between the wheels and the frame of the vehicle, and an electro-magnetically acting suspension device also inserted between the wheels and the frame of the vehicle, said ball-bearings and suspension device being adapted to mutually assist and maintain one another in the proper position.

2. A device for transmitting the load of wheeled vehicles to their wheels, comprising bodies of iron mounted on the vehicle axles, magnetic bodies arranged in proximity of said bodies of iron and supporting the frame of the vehicle, the ends of said magnetic bodies having the shape of rings surrounding the vehicle axles, ball-bearings mounted in said rings and maintaining a constant distance between the vehicle axes and said magnetic bodies, means for exciting the magnetic bodies, and means for movably connecting the magnetic bodies to the frame of the vehicle.

3. A device for transmitting the load of wheeled vehicles to their wheels, comprising bodies of iron mounted on the vehicle axles, magnetic bodies arranged beneath said bodies of iron and supporting the frame of the vehicle, the ends of said magnetic bodies having the shape of rings surrounding the vehicle axles, ball-bearings mounted in said rings and maintaining a constant distance between the vehicle axles and said magnetic bodies, means for exciting the magnetic bodies, fork-shaped members connected to said magnetic bodies, bolts for supporting said members, and supports fixed to the frame of the vehicle carrying said bolts.

In testimony that I claim the foregoing as my invention, I have signed my name.

HENRI ZOELLY.